United States Patent Office 3,364,185
Patented Jan. 16, 1968

3,364,185
PHOSPHOSULFURIZED POLYMERS
Donald I. Hoke, Chagrin Falls, Ohio, assignor to The Lubrizol Corporation, Wickliffe, Ohio, a corporation of Ohio
No Drawing. Filed Oct. 19, 1965, Ser. No. 498,141
18 Claims. (Cl. 260—79.5)

This invention relates to a new chemical process and to the oil-soluble products obtained from that process. More particularly, it relates to a novel process for preparing neutralized and partially neutralized phosphosulfurized polymers and to lubricating compositions containing such compositions.

In the lubricating of internal combustion engines and other machinery, one of the recurring problems is the contamination of the lubricant with foreign matter. Such foreign matter includes dirt, soot, water, and blow-by products of fuels (acidic products, halogen-containing products, etc.). This foreign matter is generally oil-soluble and its presence causes the lubricant to form sludge deposits which, in turn, clog filters and settle on the working parts of the machinery tending to erode and corrode the parts. Contamination often can be minimized by incorporating a dispersant into the lubricant. The dispersant maintains the foreign matter in a state of suspension as finely-divided particles, and thus prevents the deposition thereof.

Another recurring problem in the operation of machinery, especially internal combustion engines, is the oxidation and corrosion of the working parts of the machinery caused by the contaminants. The contaminants responsible for this type of adverse condition are usually acidic products obtained from blow-by products of fuels, and oxidized products of the lubricant. Formation of these acidic products is accelerated by stop-and-go driving operations which tend to accumulate moisture within the machinery during the cooling-off period. To minimize the oxidation and corrosion problem, inhibitors are added to the lubricant which tend to retard the formation of these acidic products and form a protective film on the working parts of the machinery, e.g., sensitive bearing surfaces.

It has been found that a dual purpose additive, i.e., one that acts as a dispersant and as an oxidation and corrosion inhibitor, can be prepared by the process of this invention.

It is, therefore, an object of this invention to provide a novel process for preparing compositions of matter.

It is also an object of this invention to provide novel compositions of matter prepared by this process.

It is another object of this invention to provide compositions which are useful as dispersants and oxidation and corrosion inhibitors.

Still further, it is an object of this invention to provide improved lubricating compositions containing the products of the process of this invention.

It is a further object of this invention to provide novel compositions of matter which are useful as dispersants and emulsifiers in emulsion, particularly oil-in-water emulsions.

These and other objects of this invention are accomplished by providing a process for preparing an oil-soluble phosphorus-containing composition comprising (A) Preparing a phosphosulfurized polymer by heating at a temperature of from about 100° C. to about 300° C., a mixture of an olefin polymer having a molecular weight of from about 300 to about 100,000, and from about 1.5% to about 25% by weight of a phosphorus sulfide, and (B) Neutralizing, at a temperature of from about 50° C. to about 300° C., the phosphosulfurized polymer with a hydroxy compound having the structural formula

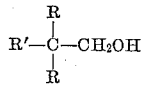

wherein R is selected from the group consisting of alkyl and hydroxyalkyl, and R' is selected from the group consisting of hydroxy, alkyl, and hydroxyalkyl radicals.

A particularly preferred process for preparing the phosphorus-containing compositions of this invention involves the hydrolysis, at a temperature of from about 100° C. to about 300° C., of the phosphosulfurized polymer before it is neutralized with the hydroxy compound.

The products obtained from the process of this invention are useful as additives in lubricating oils to disperse oil-insoluble by-products and to inhibit the oxidation of lubricating oils and the corrosion of metal surfaces within the engine. These products are also useful as additives in fuel oil, cutting oils and in other applications where insoluble materials need to be suspended or where a material needs to be inhibited from oxidation and corrosion. These products also function as emulsifiers in oil-in-water emulsions.

The olefin polymers of the phosphosulfurized polymers include polymers obtained from mono-olefins and medial-olefins. The olefins contemplated include those having from 2 to about 30 carbon atoms. The especially useful polymers are the polymers of 1-mono-olefins, e.g., ethylene, propene, 1-butene, isobutene, 1-hexene, 1-octene, 2-methyl-1-heptene, 3-cyclohexyl-1-butene, and 2-methyl-5-propyl-1-hexene. The especially useful polymers of medial olefins, i.e., olefins in which the olefinic linkage is not at the terminal position, include those obtained from 2-butene, 3-pentene, and 4-octene. Those polymers derived from lower mono-olefins, i.e., olefins having less than about 5 carbon atoms are particularly preferred.

Also useful are interpolymers of the above illustrated olefins with other interpolymerizable olefinic substances such as aromatic olefins, cyclic olefins, and poly-olefins. Such interpolymers include those obtained by polymerizing isobutene with styrene, isobutene with butadiene, propene with isoprene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, and isobutene with a mixture of styrene and piperylene.

Specific examples of useful interpolymers include the following (percent by weight): copolymer of 95% of isobutene with 5% of styrene, terpolymer of 98% of isobutene with 1% of piperylene and 1% of chloroprene, terpolymer of 95% of isobutene with 2% of 1-butene and 3% of 1-hexene, terpolymer of 60% of isobutene with 20% of 1-pentene and 20% of 1-octene, copolymer of 80% of 1-hexene and 20% of 1-heptene, terpolymer of 90% of isobutene with 2% of cyclohexene and 8% of propene, and copolymer of 80% of ethylene and 20% of propene.

The relative proportions of the mono-olefins to the other olefins in the interpolymers influence the stability and oil-solubility of the products of this invention. Thus, for reasons of oil-solubility and stability, the polymers and interpolymers contemplated for use in this invention should be substantially aliphatic and substantially saturated, i.e., they should contain at least about 80% and preferably about 95%, on a weight basis, of units derived from the aliphatic mono-olefins and no more than about 5% of olefinic linkages based on the total number of carbon to carbon covalent linkages. In most instances, the percent of olefinic linkages should be less than about 2% of the total number of carbon to carbon covalent linkages.

The methods of preparing the polymers and interpolymers illustrated above are well known. A particularly useful method comprises the treatment of an olefin (e.g., isobutene) at a temperature of from about −60° C. to about 20° C. with a Friedel-Crafts catalyst, e.g., boron trifluoride. The use of a solvent to facilitate mixing and transfer of the heat of reaction is advantageous. Such solvents include n-butane, isobutane, n-hexane, naphtha and carbon tetrachloride.

The size of the polymer appears to determine the effectiveness of the compositions of the process of this invention as dispersants in lubricating oils. Olefin polymers having molecular weights above about 300 are useful. The size of the polymer should be within the molecular weight range of from about 300 to about 100,000. Olefin polymers having a molecular weight of from about 300 to about 5,000 are preferred for this invention. However, the higher molecular weight polymers having molecular weights from about 10,000 to about 70,000 are useful and have been found to impart viscosity index improving properties to the composition of the invention. In many instances, the use of the higher molecular weight olefin polymers is desirable.

The most common source of the polymers are the polyolefins such as polyethylene, polypropylene, polyisobutene, and polybutene. A particularly preferred poly-olefin is polyisobutene having a molecular weight of about 1,000.

The phosphorus sulfide compounds useful in this invention include phosphorus trisulfide, phosphorus sesquisulfide, phosphorus pentasulfide, and phosphorus heptasulfide. Other useful phosphosulfurizing agents include phosphorus thiochloride, phosphorus thiobromide, phosphorus and sulfur monochloride, phosphorus and sulfur, and phosphorus and sulful dichloride. For reasons of economy as well as effectiveness as a reactant, phosphorus pentasulfide is preferred for this invention.

Preparation of the phosphosulfurized polymer is effected by mixing, generally at a temperature above about 80° C., and preferably between 100° C. and 300° C., the olefin polymer with from about 1.5% to about 25% by weight of a phosphorus sulfide. The amount of phosphorus sulfide to be used in the treatment is dependent on the molecular weight of the olefin polymer and the nature of the product desired. For most applications, products having a phosphorus content of from about 0.05% to about 10%, more often from about 0.1% to 5% are desirable. Thus, the higher the molecular weight of the polymer, the more phosphorus sulfide must be used.

It is preferred that the preparation of the phosphosulfurized polymer be carried out at a temperature within the range of from about 225° C. to about 300° C. and for a period of time within the range of from about 4 to about 7 hours. Temperatures down to 100° C. can be used. However, at these temperatures the reaction time will be longer, e.g., up to 10 or more hours.

The phosphorus and sulfur containing products obtained by reacting the polymer with a phosphorus sulfide are acidic compositions which are susceptible to neutralization. It is, however, advantageous to hydrolyze these products before they are neutralized with the hydroxy compounds of this invention. The hydrolysis step removes that portion of the phosphorus and sulfur which is held loosely and results in a product of light color and high stability.

Hydrolysis of the phosphosulfurized polymer is effected by introducing water or steam into the polymer at temperatures within the range of about 100° C. to about 300° C., preferably at about 125° C. to about 200° C., until the neutralization number of the polymer is constant, generally about 5 hours. The neutralization number as used in this specification indicates the relative acid strength of the phosphosulfurized polymer and is defined as the number of milligrams of 0.12 normal aqueous potassium hydroxide solution required to neutralize a one-gram sample of the polymer using phenolphthalein indicator. It is believed that this process step replaces some of the sulfur atoms within the polymer with oxygen atoms. The hydrolyzed phosphosulfurized polymers generally are characterized by the presence of about one sulfur atom for each phosphorus atom, and are preferred.

Neutralization of the phosphosulfurized polymer is effected with a hydroxy compound having the structural formula

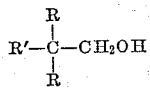

wherein R is selected from the group consisting of alkyl and hydroxyalkyl radicals, and R′ is selected from the group consisting of hydroxy, alkyl and hydroxyalkyl radicals. The alkyl and hydroxyalkyl radicals include those containing from 1 to about 15 carbon atoms. Polyhydroxy compounds are preferred in this invention. Examples of the hydroxy compounds useful in this invention include 2,2 - dimethyl ethylene glycol, trimethylolethane, pentaerythritol, 2,2,4-trimethyl-1,3-pentanediol, 2,2-dimethyl-1-butanol, 2-methyl-2-ethyl-1-hexanol, 2-methylol-2-ethyl-1-pentanol, and 2,2,4,7 - tetramethyl - 3,6 - dihydroxy-1-octanol.

The amount of hydroxy compound required to neutralize the phosphosulfurized polymer depends upon the neutralization number of the polymer. The neutralization of the phosphosulfurized polymer need not be complete since phosphosulfurized polymers which have been partially neutralized, i.e., a reduction in neutralization number of at least 25%, are contemplated as being within the scope of the invention. Hence, the products of the invention may have neutralization numbers of from about 1 (acid) to about 25 (acid), the number being determined as defined previously. Generally from about 0.2 to about 5 equivalents of the hydroxy compound is used for each equivalent of acid. The phosphosulfurized acids contain two equivalents per mole. The number of equivalents of hydroxy compound is determined by the number of hydroxy radicals in the molecule. For example, one mole of 2,2-dimethyl ethylene glycol has two equivalents per mole while pentaerythritol has four equivalents per mole.

The structure of the hydroxy compound is critical to this invention. For example, compounds such as methanol, ethylene glycol, isopropanol, 1-butanol, 2-ethylhexanol, and 1-decanol will not substantially neutralize the hydrolyzed phosphosulfurized polymer. It is, therefore, critically important that the hydroxy compounds conform to the above-indicated structure and contain no hydrogen atom on the carbon atom which is alpha to the carbon containing the hydroxyl radical. Where polyhydroxy compounds are utilized in the neutralization, there must be no hydrogens on the carbon atom alpha to one of the carbon atoms having a hydroxy radical.

Neutralization of the phosphosulfurized polymer can be effected by introducing the hydroxy compound at temperatures within the range of from about 50° to about 300° C. and mixing the reaction mass for a period of time sufficient to substantially reduce the neutralization number of said phosphosulfurized polymer. The preferred temperature range is from about 125° C. to about 175° C. The time required to substantially neutralize the polymer includes periods ranging from about 4 to about 22 hours.

It is sometimes desirable to dry the neutralized phosphosulfurized polymer although, in some cases, the undried polymer can be used as such. Drying the neutralized polymer can be accomplished by heating it at temperatures within the range of from about 125° C. to the decomposition temperature thereof. The dried neutralized polymer can be further refined by filtration. For most purposes of this invention, the drying and filtration steps are preferred.

The products obtained from the process of this invention cannot be defined by any specific chemical terminology. The exact character of the product structure is not known other than the fact that it is a hydrocarbon containing phosphorus and sulfur and that it is a good dispersant and oxidation and corrosion inhibitor.

The following examples illustrate the process of this invention, all parts are by weight.

EXAMPLE 1

To 2220 parts of a polyisobutene having a molecular weight of 850, there is added, at 90° C., 200 parts of phosphorus pentasulfide. The mixture is maintained at 255°–265° C. for 5.5 hours. Thereupon, the mixture is cooled to 150°–160° C. and is bubbled at this temperature with steam at a rate of 80 parts per hour for 5 hours. The resulting mixture has a neutralization number of 40 (acid). To 1448 parts (0.5 mole) of the steam-treated material and 600 parts of xylene, there is added 70 parts (0.5 mole) of pentaerythritol. The mixture is maintained at 150°–155° C. for 6.25 hours. The mixture is then diluted with 526 parts of mineral oil and filtered. The filtrate has a neutralization number of 11 (acid), a sulfur content of 1.5% and a phosphorus content of 1.3%.

EXAMPLE 2

To 3330 parts of a polyisobutene having a molecular weight of 1000, there is added, at 95° C., 300 parts of phosphorus pentasulfide. The mixture is maintained at 257°–263° C. for 5 hours. The mixture is then cooled to 149°–160° C. and bubbled for 5 hours at this temperature with steam at a rate of 200 parts per hour. The hydrolyzed phosphosulfurized polymer has a neutralization number of 39.1 (acid). To 2915 parts (2.04 equivalents) of the hydrolyzed mass and 1200 parts of xylene, there is added 138.7 parts (4.0 equivalents) of pentaerythritol. The mixture is maintained at 150°–156° C. for 21 hours. A filter aid is added and the mixture is filtered. The filtrate is then dried at 150° C./18 mm., diluted with 2038 parts of mineral oil, and filtered. The filtrate has a neutralization number of 7.9 (acid), a sulfur content of 1.3% and a phosphorus content of 1.3%.

EXAMPLE 3

To 3275 parts (2.3 equivalents) of the hydrolyzed phosphosulfurized polymer prepared in Example 2 and 1200 parts of xylene, there is added 155.5 parts (4.6 equivalents) of pentaerythritol. The mixture is maintained at 156°–158° C. for 22.25 hours and is then filtered. The filtrate is then dried at 145° C./19 mm., diluted with 2241 parts of mineral oil and filtered. The filtrate has a neutralization number of 8 (acid), a sulfur content of 1.3% and a phosphorus content of 1.3%.

EXAMPLE 4

To 1000 parts of a polyisobutene having an average molecular weight of 60,000, there is added, at 160° C., 50 parts of phosphorus pentasulfide. The mixture is maintained at 260°–295° C. for 9 hours. Thereafter, the mixture is cooled to 200° C. and bubbled at this temperature with steam until the neutralization number is constant. To 1000 parts (0.2 equivalent) of the steam-treated mixture and 1000 parts of toluene, there is added 7 parts (0.2 equivalent) of pentaerythritol. The mixture is maintained at 145°–150° C. for 10 hours and is then filtered. The filtrate is dried at 150° C./10 mm., diluted with 1000 parts of mineral oil and filtered to give the desired product.

EXAMPLE 5

To 6000 parts of a polyisobutene having a molecular weight of 980, there is added, at 105° C., 888 parts of phosphorus pentasulfide. The mixture is maintained at 250°–260° C. and bubbled with nitrogen for 4.75 hours. The mixture is then contacted at 150°–160° C. with steam for 4 hours. The hydrolyzed phosphosulfurized polymer has a neutralization number of 56.4 (acid). To 2836 parts (4 equivalents) of this polymer and 2500 parts of toluene, there is added 272 parts (8 equivalents) of pentaerythritol. The mixture is maintained at 145°–160° C. for 24 hours whereupon the mixture is dried at 150° C./20 mm., diluted with 2070 parts of mineral oil, and filtered. The filtrate has a neutralization number of 15 (acid), a sulfur content of 1.02% and a phosphorus content of 2.1%.

EXAMPLE 6

To 353 parts (0.25 equivalent) of a hydrolyzed phosphosulfurized polymer prepared as in Example 2 but with a neutralization number of 39.7 (acid), there is added 125 parts (1.25 equivalents) of 2,2-dimethyl-1-butanol. The mixture is maintained at 145°–150° C. for 8 hours and at 210° C. for 12 hours. The mixture is then dried at 160° C./10 mm. and filtered to give the desired product.

EXAMPLE 7

To 2000 parts of a polybutene having a molecular weight of 2000, there is added, at 200° C., 400 parts of phosphorus pentasulfide. The mixture is maintained at 220°–250° C. for 4 hours and is then treated with steam at this temperature for 5 hours. Thereafter, 500 parts of mineral oil and 480 parts (12 equivalents) of trimethylolethane are added to the mixture. The mixture is maintained at 130°–145° C. for 12 hours and is then dried. The dried mixture is filtered to give the desired product.

EXAMPLE 8

To 3000 parts of a polyisobutene having a molecular weight of 338, there is added, at 125° C., 740 parts of phosphorus pentasulfide. The mixture is maintained at 140°–175° C. for 12 hours and is then contacted with steam at 200°–225° C. for 4 hours. Thereafter, 1000 parts of mineral oil and 438 parts (6 equivalents) of 2,2,4-trimethyl-1,3-pentanediol are added to the mixture. The mixture is maintained at 160°–175° C. for 15 hours and is then dried. The residue is filtered to give the desired product.

EXAMPLE 9

A product is obtained by the procedure of Example 6 except that 110 parts of neopentyl alcohol (1.25 equivalents) are used in lieu of the 2,2-dimethyl-1-butanol.

EXAMPLE 10

To 3580 parts (2.5 equivalents) of the hydrolyzed phosphosulfurized polymer described in Example 2, there is added, at 50° C., 326 parts (2.5 equivalents) of 2,2-dimethyl-1-hexanol. The mixture is maintained at 150°–165° C. for 13 hours. Thereafter, the mixture is diluted with 2574 parts of mineral oil and filtered to give the desired product.

EXAMPLE 11

To 1,000 parts of a polyisobutene having a molecular weight of 70,000, there is added at 100° C., 24 parts of phosphorus pentasulfide. The mixture is maintained at 250°–270° C. for 6 hours and is then cooled to 160°–170° C., at which temperature it is treated with steam until a constant neutralization number (11.5 acid) is obtained. To 1,000 parts (0.21 equivalent) of the above material and 1,000 parts of toluene, there is added 7 parts (0.2 equivalent) of pentaerythritol. The mixture is maintained at 145°–150° C. for 10 hours. Thereupon, the mixture is dried at 150° C./10 mm. and filtered. The filtrate has a neutralization number of 5 (acid), a sulfur content of 0.5% and a phosphorus content of 0.55%.

EXAMPLE 12

The procedure of Example 1 is repeated except that an equivalent amount of polypropylene having a molecular weight of 10,000 is used in lieu of the polyisobutene.

EXAMPLE 13

To 2109 parts of a polyisobutene having an average molecular weight of 1,000, there is added, at 75°–80° C., 190 parts of phosphorus pentasulfide. The mixture is heated to 250° C. and maintained at a temperature of from 250° C. to 261° C. for 5.5 hours in a nitrogen atmosphere. The mixture is cooled and filtered. The filtrate is found to have 2.3% phosphorous and a neutralization number of 12 (acid).

To 1749 parts (1.34 moles) of this filtrate, there is added 744 parts of mineral oil and 182 parts (1.34 moles) of pentaerythritol. The mixture is heated at 198°–203° C. for 8 hours in an atmosphere of nitrogen. Mineral oil (520 parts) is added and the solution is filtered at 150° C. The filtrate is the desired product having a neutralization number of 8.2 (acid), a phosphorus content of 1.20, and a sulfur content of 1.37.

EXAMPLE 14

The procedure of Example 13 is repeated except that 2,2-dimethyl-1-butanol is used in lieu of pentaerythritol.

The products obtained by the process of this invention are useful as dispersants and oxidation and corrosion inhibitors in lubricating oils, fuel oils, cutting oils, etc. The products are also useful as emulsifiers in oil-in-water emulsions and as fire-resistant additives for hydraulic fluids. When used in lubricating oils and emulsion, the products of the invention are usually present in amounts ranging from about 0.3% to about 18% by weight. The optimum amounts of the product depends on the type of service to which the lubricating oils are to be subjected. For example, lubricating oils for use in gasoline internal combustion engines may contain from about 0.3 to about 5% by weight of the products of the invention whereas lubricating oils for use in differential housings and diesel engines may contain as much as 15% or even more of the additive.

This invention contemplates also the use of other additives in the lubricating compositions. Examples of other additives include detergents of the ash-containing type, detergents of the ashless-containing types, oxidation inhibiting agents, corrosion inhibiting agents, viscosity index improving agents, pour point depressing agents, extreme pressure agents, color stabilizers and anti-foam agents.

The ash-containing detergents and dispersants include oil-soluble neutral and basic alkali metal, alkaline earth metal, magnesium, zinc and nickel salts of sulfonic acids, carboxylic acids and phosphorus acids. The basic salts can be prepared by mixing the acid with an excess of a basic metal neutralizing agent, a suitable promoter such as a phenolic compound, and a small amount of water, and carbonating the mixture at a temperature within the range of from about 50° C. to about 200° C. until the mixture is substantially neutral.

Examples of ashless-containing detergents include oil-soluble products obtained from the reaction of a hydrocarbon-substituted succinic anhydride and an alkylene polyamine. Boric acid may be reacted with a basic product of the above reaction to give an improved product. The hydrocarbon substituent can be of a polymer-type with a molecular weight within the range of from about 300 to about 100,000.

Extreme pressure agents and oxidation-inhibiting and corrosion-inhibiting agents useful with the products of this invention include the chlorinated aliphatic hydrocarbons, organic sulfides and polysulfides, phosphosulfurized hydrocarbons, phosphorus esters including dihydrocarbon and trihydrocarbon phosphites, metal thiocarbamates, metal phosphinodithioates and metal phosphorodithioates.

Examples of pour point depressing agents include polymers of ethylene, propylene, isobutene, and poly-(alkylmethacrylates). Examples of anti-foam agents include polymeric alkyl siloxanes, poly(alkylmethacrylates), and condensation products of alkyl phenols with formaldehyde and polyamines.

The following examples are illustrative of lubricating compositions containing the products of this invention (percents are by weight unless otherwise designated):

Lubricant A

| | |
|---|---:|
| SAE 20 mineral lubricating oil | 95.88 |
| Product of Example 2 | 3.3 |
| Zinc salt of a phosphorodithioic acid prepared by the reaction of phosphorus pentasulfide with a mixture of 65% (mole) of isobutyl alcohol and 35% (mole) of mixed primary amyl alcohols | 0.79 |
| Poly-(alkyl siloxane) anti-foam agent | 0.003 |

Lubricant B

| | |
|---|---:|
| SAE 20 mineral lubricating oil | 97.45 |
| Product of Example 3 | 1.35 |
| Barium salt obtained by neutralizing, in the presence of heptyl phenol, a hydrolyzed polypropylene substituted phosphosulfurized acid with barium oxide | 1.20 |
| Poly-(alkyl siloxane) anti-foam agent | 0.003 |

Lubricant C

| | |
|---|---:|
| SAE 30 mineral lubricating oil | 96.04 |
| Product of Example 3 | 2.08 |
| Zinc salt of Example A | 0.79 |
| Boron containing product obtained by reacting a polyisobutylene substituted succinic anhydride with a polyethylene polyamine (having an average composition corresponding to that of pentaethylenehexamine) and then reacting with boric acid | 1.09 |
| Poly-(alkyl siloxane) anti-foam agent | 0.003 |

Lubricant D

| | |
|---|---:|
| SAE 30 mineral lubricating oil | 84.6 |
| Product of Example 6 | 15.4 |

Lubricant E

| | |
|---|---:|
| SAE 20 mineral lubricating oil | 94.2 |
| Product of Example 13 | 5.8 |

Lubricant F

| | |
|---|---:|
| SAE 20 mineral lubricating oil | 83.29 |
| Product of Example 10 | 15.00 |
| Zinc salt of a phosphorodithioic acid prepared by reacting phosphorus pentasulfide with isooctyl alcohol | 1.71 |
| Poly-(alkyl siloxane) anti-foam agent | 0.003 |

Lubricant G

| | |
|---|---:|
| SAE 30 mineral lubricating oil | 91.21 |
| Product of Example 11 | 8.00 |
| Zinc salt of Example A | 0.79 |
| Poly-(alkyl siloxane) anti-foam agent | 0.003 |

The effectiveness of the phosphorus-containing compositions of this invention as oxidation-inhibiting and detergent additives in lubricants is illustrated by the results obtained from the following Oxidation-Detergency test. In this test, a 350 cc. lubricant sample consisting of a Mid-Continent, conventionally refined lubricating oil having a viscosity SUS/100° F. containing 0.001% by weight of iron naphthenate as a promoter of oil degradation and a small amount of the additive to be tested is placed in a 2-inch x 15-inch boro-silicate tube. A 1⅜ inch x 5⅞ inch SAE 1020 steel panel and a clean copper-lead bearing are immersed in the oil. The sample is then heated at 300° F. for 96 hours while air is bubbled through the oil at a rate of 10 liters per hour. The oxidized sample is allowed to cool to 120° F. whereupon 0.5% (by volume) of water is added and dispersed into the sample. The sample is allowed to stand for 15 hours at room temperature and then filtered through dry No. 1 Whatman paper (double thickness) under slightly reduced pressure. The precipitate is washed with naphtha and dried. The weight of the precipitate, adjusted to milligrams per 100 cc. of oil tested, is taken as a measure of the effectiveness of the detergent additive, i.e., the greater the weight of the precipitate, the less effective the additive. The results of the test, summarized in Table I, show the utility of the compositions of this invention as detergents in lubricating oils.

TABLE I.—OXIDATION-DETERGENCY TEST

| Additive | Percent by weight (diluent free) | Sludge (mg./100 ml. lubricant) |
| --- | --- | --- |
| None | | 1,312 |
| Product of Example 5 | 1.5 | 232 |
| Product of Example 11 | 4 | 73 |

The utility of the compositions of the invention as dispersants also is shown by the results of a modified version of the CRC-EX-3 engine test. Ordinarily this engine test lasts for 96 hours; however, the modified version lasts for 144 hours. This test is recognized in the lubricating field as an important test by which lubricants can be evaluated for use under light-duty service conditions. In this test, a lubricant is used in the crankcase of a 1954 6-cylinder Chevrolet Powerglide engine for 144 hours under recurring cycling conditions. Each cycle consists of the following: (A) 2 hours at an engine speed of 500±25 r.p.m. under 0 load at an oil sump temperature of 100°–125° F., and an air fuel ratio of 10:1; (B) 2 hours at an engine speed of 2500±25 r.p.m. under a load of 40 BHP at an oil sump temperature of 160°–170° F., and an air-fuel ratio of 16:1; (C) 2 hours at an engine speed of 2500±25 r.p.m. under a load of 40 BHP at an oil sump temperature of 240°–250° F., and an air-fuel ratio of 16:1.

After completion of the test, the engine is dismantled and inspected for sludge and varnish in accordance with the CRC deposit rating system. The rating is based on (1) the extent of piston ring-filling, (2) the amount of sludge formed in the engine (on a scale of 80–0, 80 being indicative of no sludge and 0 being indicative of extremely heavy sludge), and (3) the total amount of engine deposits, i.e., sludge and varnish, formed in the engine (on a scale of 100–0, 100 being indicative of no deposits and 0 being indicative of extremely heavy deposits). The utility of the compositions of this invention as dispersants is shown by the following results (Table II):

TABLE II.—CRC-EX-3 ENGINE TEST

| Lubricant | Percent Piston Ring-Filling | Sludge Rating | Total Deposit Rating |
| --- | --- | --- | --- |
| A | 1 | 78.1 | 97.1 |
| B | 1 | 75.5 | 91.9 |

The utility of the compositions of this invention as oxidation and corrosion inhibitors is shown by the results of an oxidation and bearing corrosion test (Tentative Standard Method 3405-T of Federal Test Method Standard No. 791). This test involves the continuous operation of a single-cylinder CLR Oil Test Engine having a 3.8″ bore, 3.75″ stroke, and 45.5 cubic inch displacement. The engine is run under constant speed, air-fuel ratio, and fuel flow conditions for a total of 40 hours. Before the test, the engine is thoroughly cleaned, pertinent measurements of engine parts are taken and a complete set of new piston rings and new copper-lead connecting rod test bearing inserts are installed. The lubricant is used in the crankcase of the engine. After the engine is run for 40 hours, the lubricant is evaluated with respect to stability or resistance to oxidation, copper-lead bearing corrosion and deposition of varnish and/or sludge on engine parts. This test does not evaluate the dispersant and detergent characteristics of the lubricant. The operating conditions of the test are as follows:

Speed—3150±25 r.p.m.
Air-fuel ratio—14.0±0.5 to 1.
Oil sump temperature—290° F.±2° F.
Fuel flow—4.75±0.25 lbs./hr.
Load—Adjust to provide proper fuel flow at specified air-fuel ratio.

After completion of the test, the piston is rated for piston skirt varnish (on a scale of 10–0, 10 being indicative of no varnish and 0 being indicative of maximum amount of varnish) and the copper-lead bearing is evaluated for weight loss (a loss of less than 50 milligrams is indicative of a superior lubricant). The utility of the invention as a corrosion and oxidation inhibitor is shown in Table III.

TABLE III.—OXIDATION AND BEARING CORROSION TEST

Lubricant C:
    Piston skirt varnish rating _____ 10
    Copper-lead bearing weight loss, mg. _____ 14.7

As mentioned previously, the compositions obtained by the process of this invention are useful as emulsifiers in oil-in-water emulsions. This utility is demonstrated by the following stability test. In this test, a 3% solution of the additive to be tested is prepared in a highly refined white oil. Forty parts by weight of this oil solution is added to 80 parts by weight of water, mixed well, and then allowed to stand undisturbed at room temperature for several hours. The amount of oil which separates from the emulsion is noted over this period. The results of this test, shown in Table IV, clearly demonstrate the utility of the products of the invention as emulsifiers.

TABLE IV.—OIL-IN-WATER EMULSION STABILITY

| Additive | Oil separation (percent) at end of— | | | |
| --- | --- | --- | --- | --- |
| | 1.2 hrs. | 11.5 hrs. | 1 week | 1 month |
| None | *100 | | | |
| Product of Example 5 | 1 | 1 | 19.8 | 20 |

*Within five minutes.

What is claimed is:
1. A process of preparing an oil-soluble phosphorus-containing composition comprising
    (A) preparing a phosphosulfurized polymer by heating at a temperature of from about 100° C. to about 300° C., a mixture of an olefin polymer having a molecular weight of from about 300 to about 100,000, and from about 1.5% to about 25% by weight of a phosphorus sulfide, and
    (B) neutralizing, at a temperature of from about 50° C. to about 300° C., the phosphosulfurized polymer with a hydroxy compound having the structural formula

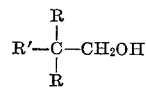

wherein R is selected from the group consisting of alkyl and hydroxyalkyl, and R' is selected from the group consisting of hydroxy, alkyl, and hydroxyalkyl radicals.

2. The process of claim 1 wherein the olefin polymer of (A) is polyisobutene.
3. The process of claim 2 wherein the polyisobutene has a molecular weight of from about 700 to about 1500.
4. The process of claim 1 wherein R and R' of the hydroxy compound of (C) are hydroxyalkyl radicals.
5. A process for preparing an oil-soluble phosphorus-containing composition comprising
    (A) preparing a phosphosulfurized polymer by heating at a temperature of from about 100° C. to about 300° C., a mixture of an olefin polymer having a molecular weight of from about 300 to about 100,000 and from about 1.5% to about 25% by weight of a phosphorus sulfide;

(B) hydrolyzing said phosphosulfurized polymer at a temperature of from about 100° C. to about 300° C., and (C) neutralizing, at a temperature of from about 50° C. to about 300° C., the hydrolyzed phosphosulfurized polymer with a hydroxy compound having the structural formula $$\mathrm{R'-\underset{\underset{R}{|}}{\overset{\overset{R}{|}}{C}}-CH_2OH}$$

wherein R is selected from the group consisting of alkyl and hydroxyalkyl, and R' is selected from the group consisting of hydroxy, alkyl, and hydroxyalkyl radicals.

6. The process of claim 5 wherein the olefin polymer of (A) is a polyisobutene.

7. The process of claim 6 wherein the polyisobutene has a molecular weight of from about 700 to about 1500.

8. The process of claim 5 wherein the phosphorus sulfide of (A) is phosphorus pentasulfide.

9. The process of claim 5 wherein R and R' of the hydroxy compound of (C) are hydroxyalkyl radicals.

10. The process of claim 5 wherein the hydroxy compound of (C) is pentaerythritol.

11. The process of preparing an oil-soluble phosphorus-containing composition comprising (A) preparing a phosphosulfurized polyisobutene by heating at a temperature of from about 100° C. to about 300° C., a mixture of a polyisobutene having a molecular weight of about 700 to about 1500, and about 1.5% to 15% by weight of phosphorus pentasulfide, (B) hydrolyzing said phosphosulfurized polyisobutene at a temperature within the range of from about 100° C. to about 300° C., and (C) neutralizing, at a temperature of from about 50° to about 300° C., the hydrolyzed phosphosulfurized polyisobutene with a hydroxy compound having the structural formula $$\mathrm{R'-\underset{\underset{\underset{R}{|}}{CH_2}}{\overset{\overset{\overset{R}{|}}{CH_2}}{C}}-CH_2OH}$$

wherein R is selected from the group consisting of hydrogen, hydroxy, alkyl, and hydroxyalkyl radicals, and R' is selected from the group consisting of hydroxy, alkyl, and hydroxyalkyl radicals.

12. The process of claim 7 wherein the polyisobutene of (A) has a molecular weight of about 1,000.

13. The process of claim 7 wherein the hydroxy compound of (C) is pentaerythritol.

14. The process of claim 7 wherein the hydroxy compound of (C) is 2,2-dimethylmethyl-1-butanol.

15. The product of the process of claim 1.

16. The product of the process of claim 5.

17. A lubricating composition comprising a major proportion of a lubricating oil and from about 0.3% to about 80% by weight of the product of the process of claim 1.

18. A lubricating composition comprising a major proportion of a lubricating oil and from about 0.3% to about 80% by weight of the product of the process of claim 5.

References Cited
UNITED STATES PATENTS

| 2,316,078 | 4/1943 | Loane | 260—79.5 |
| 3,278,433 | 10/1966 | Kenilworth | 260—79.5 |

JOSEPH L. SCHOFER, *Primary Examiner.*

D. DENENBERG, *Assistant Examiner.*

UNITED STATES PATENT OFFICE
CERTIFICATE OF CORRECTION

Patent No. 3,364,185 January 16, 1968

Donald I. Hoke

It is certified that error appears in the above identified patent and that said Letters Patent are hereby corrected as shown below:

Column 1, line 20, "oil-soluble" should read -- oil-insoluble --. Column 3, line 34, "sulful" should read -- sulfur --. Column 12, lines 26 and 29, "80% by weight", each occurrence, should read -- 18% by weight --.

Signed and sealed this 10th day of March 1970.

(SEAL)
Attest:

Edward M. Fletcher, Jr.
Attesting Officer

WILLIAM E. SCHUYLER, JR.
Commissioner of Patents